United States Patent [19]
Mori

[11] Patent Number: 4,844,374
[45] Date of Patent: Jul. 4, 1989

[54] ACCELERATION SENSOR FOR WEBBING RETRACTOR

[75] Inventor: Shinji Mori, Aichi, Japan

[73] Assignee: Kabushiki Kaisha Tokai-Rika-Denki-Seisakusho, Aichi, Japan

[21] Appl. No.: 145,983

[22] Filed: Jan. 20, 1988

[30] Foreign Application Priority Data

Jan. 21, 1987 [JP] Japan ............................ 62-007275[U]

[51] Int. Cl.[4] ............................................. B60R 22/40
[52] U.S. Cl. ............................................. 242/107.4 A
[58] Field of Search ................. 242/107.4 A, 107.4 B; 280/806; 297/478, 480

[56] References Cited

U.S. PATENT DOCUMENTS

| 4,046,332 | 9/1977 | Wheeler et al. | 242/107.4 A |
| 4,065,071 | 12/1977 | Holmberg | 242/107.4 A |
| 4,087,059 | 5/1978 | Lindblad | 242/107.4 A |
| 4,228,969 | 10/1980 | Svensson | 242/107.4 A |
| 4,467,981 | 8/1984 | Mori et al. | 242/107.4 A |
| 4,556,177 | 12/1985 | Kuwakado et al. | 242/107.4 A |
| 4,603,819 | 8/1986 | Loose et al. | 242/107.4 A |

Primary Examiner—John M. Jillions
Attorney, Agent, or Firm—Sixbey, Friedman, Leedom & Ferguson

[57] ABSTRACT

A sensor is used in a retractor of a seat belt apparatus of a vehicle for winding a webbing to be fastened on an occupant of the vehicle and serves to prevent a webbing take-up shaft from rotating in the direction where the webbing is wound out. A bracket which supports an inertial body is mounted on the retractor through mounting means which allow the angle at which the bracket is mounted on the retractor to be selectively altered. Therefore, a constant acceleration response characteristic can be maintained even if the retractor is mounted on the body of the vehicle at different angles.

23 Claims, 5 Drawing Sheets

F I G. 3
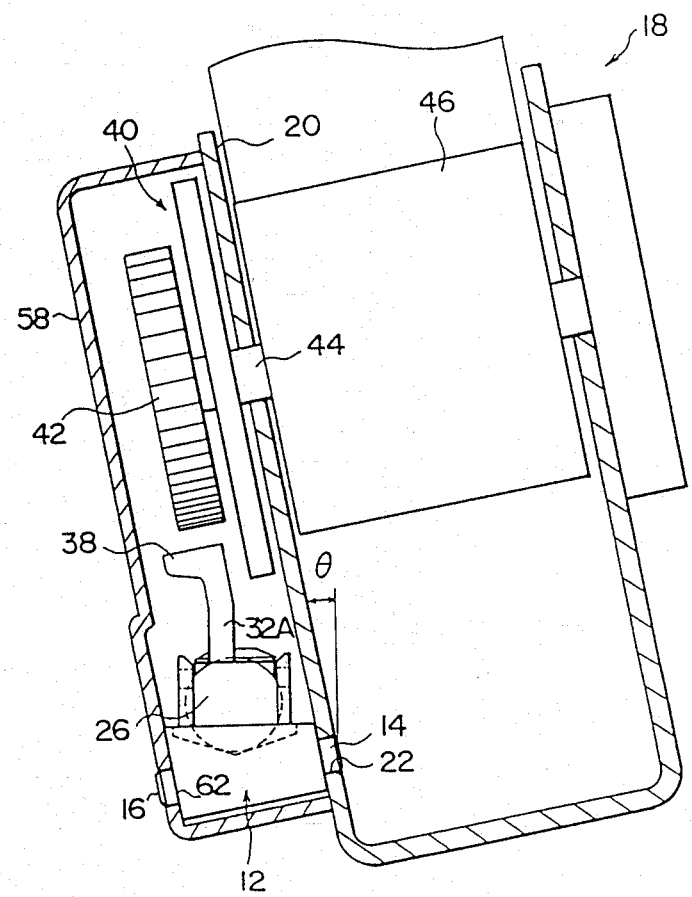

4,844,374

ACCELERATION SENSOR FOR WEBBING RETRACTOR

BACKGROUND OF THE INVENTION

1. Field of the Invention

The present invention relates to an acceleration sensor for a webbing retractor which is used in a seat belt apparatus that prevents movement of an occupant of a vehicle in an emergency situation of the vehicle, and which is adapted to the prevent a webbing from being wound out from the webbing retractor when the retractor is being subjected to acceleration.

2. Description of the Related Art

In a seat belt apparatus of a vehicle, one end portion of an occupant restraining webbing is wound in a webbing retractor by urging force and locking means acts to prevent the webbing winding-out rotation of a webbing take-up shaft of the webbing retractor in an emergency situation of a vehicle. The locking means is actuated by an acceleration sensor provided in the webbing retractor.

Such a webbing retractor is mounted in a vehicle at an angle which depends on whether the retractor is for the driver's seat or for the adjacent front seat, and on the configuration, structure, and type of the vehicle. Therefore, an acceleration sensor for this retractor has to be manufactured in accordance with the angle at which the retractor will be mounted. This means that a plurality of different types of acceleration sensor have to be prepared.

SUMMARY OF THE INVENTION

The present invention has been accomplished in view of the above-stated circumstances, and an object of the present invention is to provide an acceleration sensor for a webbing retractor which can be used even if the angle at which the webbing retractor is mounted on the vehicle is changed, so that one type of acceleration sensor can be used in common with different mounting angles of webbing retractors.

The acceleration sensor for a webbing retractor in accordance with the present invention includes a bracket for supporting an inertial body, to be mounted on the webbing retractor; mounting means provided at at least two portions of the bracket in such a manner as to enable alteration of the position at which the bracket is mounted on the webbing retractor; and inertial body-responsive member supporting means provided on the bracket in correspondence with the mounting means.

By virtue of this arrangement, with the acceleration sensor in accordance with the present invention, even if the webbing retractor is mounted on the vehicle at different angles, the mounting means and the inertial body-responsive member supporting means are each selected as required. Therefore, the acceleration sensor can be applied to vehicles of different types, using the same bracket.

BRIEF DESCRIPTION OF THE DRAWINGS

FIG. 3 is a sectional view showing a condition in which the acceleration sensor is mounted on a webbing retractor;

DESCRIPTION OF THE PREFERRED EMBODIMENTS

Figure 1:
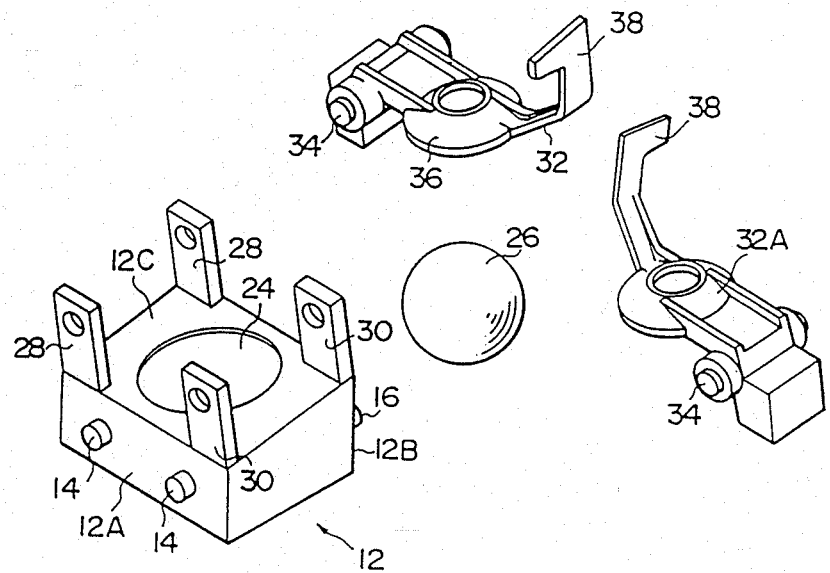
FIG. 1 is an exploded perspective view of an acceleration sensor in accordance with one embodiment of the present invention.

As shown in FIG. 1, an acceleration sensor in accordance with one embodiment of the present invention has a bracket 12. The bracket 12 is formed as a hexahedron-shaped block, with a synthetic resin. The bracket 12 has side surfaces 12A and 12B which are parallel to each other. A pair of pins 14 or 16 project from each side surface 12A or 12B to constitute mounting means. The side surfaces 12A and 12B are formed in such a way as to be inclined by the same angle from the axial center of a conical recess 24 (described later) which serves as the axis of support of an inertial body (described later), i.e., from a vertical line as viewed in FIG. 2.

As shown in FIG. 3, if a frame 20 of a webbing retractor 18 is inclined from a vertical line to one side by an angle $\theta$, the pair of pins 14 are inserted into mounting holes 22 formed in the frame 20.

Figure 4:
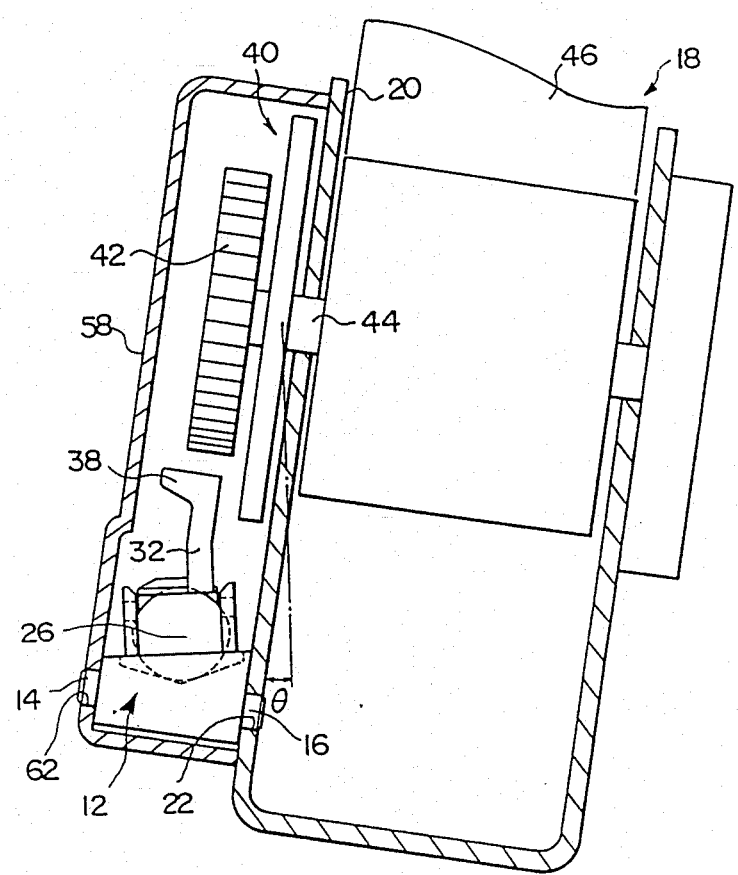
FIG. 4 is a sectional view showing a condition in which the acceleration sensor is mounted on the webbing retractor at an angle different from that shown in FIG. 3.

On the other hand, as shown in FIG. 4, if the webbing retractor 18 is mounted on the body of a vehicle in a state of being inclined from a vertical line to the other side by the angle $\theta$, the pair of pins 16 are inserted into the mounting holes 22 of the frame 20 to support the bracket 12.

The bracket 12 has a top surface 12C which is adapted to form a horizontal plane if the bracket 12 is mounted in the condition shown in FIG. 3 or 4. The conical recess 24 is formed at a central portion of the top surface 12C, and a ball 26 constituting an inertial body is placed in the conical recess 24. With this construction, therefore, when acceleration of the vehicle reaches a predetermined value, the ball 24 climbs the wall of the conical recess 24 upward.

Two pairs of arms 28 and 30 each project normally from the top surface 12C and serve as inertial body-responsive member supporting means. More specifically, if the bracket 12 is mounted on the webbing retractor 18 through the pins 16, as shown in FIG. 4, one pair of arms 28 pivotally support a pawl 32 acting as an inertial body-responsive member, through a pin 34 of the pawl 32. On the other hand, if the bracket 12 is mounted on the webbing retractor 18 through the pins 14, as shown in FIG. 3, the other pair of arms 30 pivotally support another pawl 32A through a pin 34 of the pawl 32A.

Figure 2:
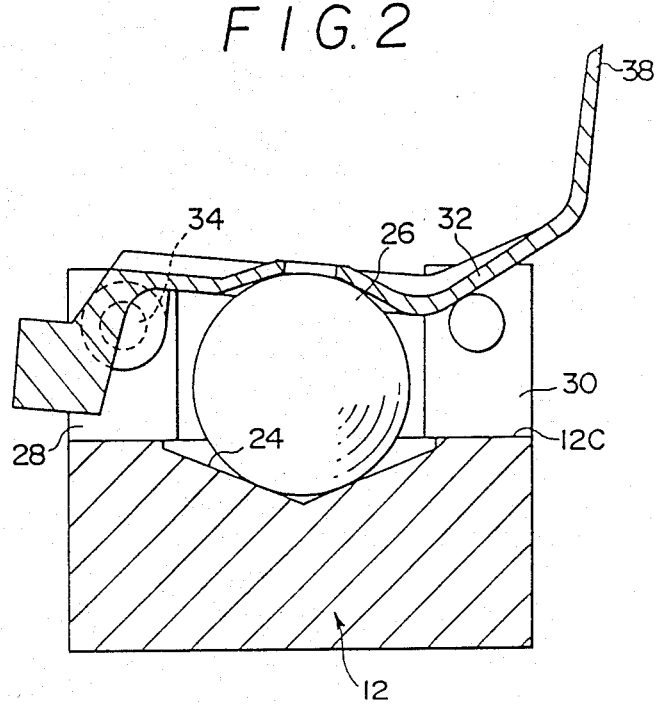
FIG. 2 is a partially sectioned side view of the acceleration sensor.
Figure 5:
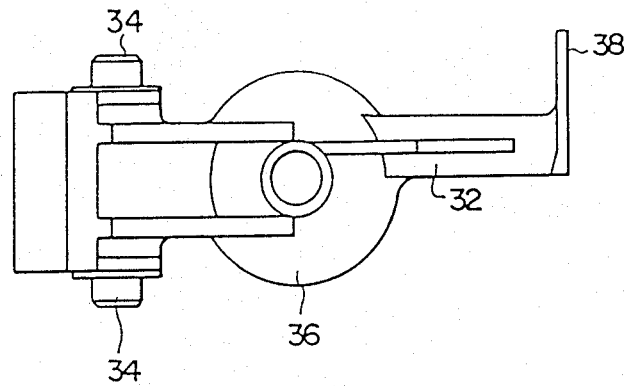
FIG. 5 is a plan view of a pole.

The pawl 32 has a conical portion 36 formed at a substantial central portion thereof, as best shown in FIG. 5, so that the pawl 32 can be placed on the ball 26, as shown in FIG. 2. The pawl 32 also has an engaging portion 38 projecting from the tip portion thereof, so that, when the accelerator sensor is incorporated in the webbing retractor 18, as shown in FIG. 3 or 4, the engaging portion 38 faces the outer periphery of a ratchet wheel 42 of locking means 40. The locking means 40 has a construction in which, when the engaging portion 38 engages with the ratchet wheel 42 to stop the rotation of the ratchet wheel 42, the rotation of a webbing take-up shaft 44 that winds an occupant-restraining webbing 46 from its one end portion is stoped, thereby preventing the winding-out of the webbing 46.

The pawl 32A has the same construction as that of the pawl 32 except that the engaging portion 38 of the pawl 32 is formed at a angle different from that of the engaging portion 38 of the pawl 32A, so that, if, as shown in FIG. 3, the webbing retractor 18 is mounted on the body of the vehicle at the angle different from that shown in FIG. 4, the engaging portion 38 of the pawl 32A is able to oppose the ratchet wheel 42 suitably.

However, the pawl 32A may be omitted provided that the configuration of the ratchet wheel 42 is modified in such a manner as to enable the pawl 32 to face the ratchet wheel 42 suitably even with the mounting condition shown in FIG. 3.

Operation of this embodiment will now be described.

Explanation will be first given concerning the case where the webbing retractor 18 is mounted on the body of the vehicle in a state of being inclined from a vertical line to one side by the angle θ, as shown in FIG. 4, thus allowing an occupant of the vehicle seated in, for instance, the driver's seat to use the webbing. In this case, the bracket 12 is mounted by a suitable method such as inserting the pins 16 into the mounting holes 22 of the frame 22 forcibly or bonding the pins 16 to the holes 22. The pins 14 projecting from the other side of the bracket 12 are inserted into circular holes 62 formed in a cover 58 for the frame 20, thereby supporting the bracket 12. The pawl 32 is pivotally supported through the pin 34 by the arms 28 projecting from the bracket 12, so that the engaging portion 38 of the pawl 32 opposes the ratchet wheel 42 through a slight gap therebetween, as shown in FIG. 4.

With this arrangement, in an emergency of the vehicle the ball 26 climbs the conical recess 24 upward due to acceleration, thus causing the pawl 32 to move upward while rotating about the pin 34. This action brings the engaging portion 38 into engagement with the ratchet wheel 42, whereby the rotation of the ratchet wheel 42 is suspended and the webbing winding-out rotation of the take-up shaft 44 webbing is prevented thus, the locking means 40 prevents the webbing 46 from being wound out.

In the case where the webbing retractor 18 is mounted on the body of the vehicle in a state of being inclined from a vertical line to the other side by the angle θ, as shown in FIG. 3, thus allowing an occupant of the vehicle seated in, for instance, the front seat adjacent to the driver's seat to use the webbing, the bracket 12 is mounted to the frame 20 by means of the pins 14. In this case, the pawl 32A is pivotally supported by the arms 30 through the pin 34. In this way, the pawl 32A is disposed in opposition to the outer periphery of the ratchet wheel 42 through a slight gap therebetween, in a similar manner as that of the pawl 32 shown in FIG. 4, so as to be able to stop the rotation of the ratchet wheel 42 in an emergency situation of the vehicle.

Accordingly, even if the webbing retractor 18 is mounted on the body of the vehicle at different angles, the same bracket 12 can be used in common, thereby eliminating the need for using a plurality of different types of bracket 12 in accordance with these mounting angles.

Figure 6:
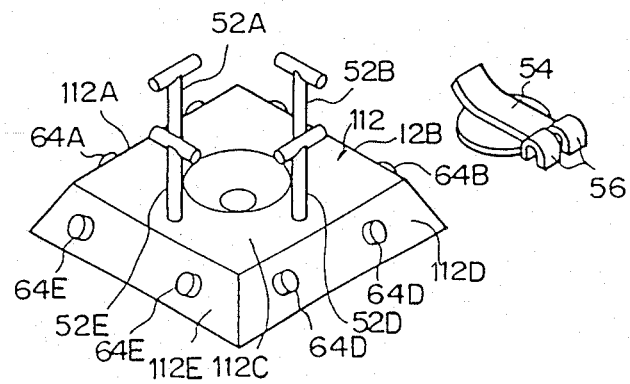
FIG. 6 is an exploded perspective view of an acceleration sensor in accordance with a second embodiment of the present invention.

FIG. 6 illustrates a second embodiment of the present invention. This embodiment is distinguished from the previous embodiment in the following arrangement. Namely, a bracket 112 has four arms 52A, 52B, 52D, and 52E, and, in correspondence with these arms, side surfaces 112A, 112B, 112D, and 112E of the bracket 112 are inclined with respect to a top surface 112C at angles which are different from each other, so as to enable mounting of the bracket 112 on a webbing retractor at different angles by alternately mounting one of the side surfaces 112A, 112B, 112D or 112E to the webbing retractor. In addition, a pair of pins 64A, 64B, 64D, or 64E, which are similar to those used in the previous embodiment, project from each of these side surfaces 112A, 112B, 112D, and 112E, for the purpose of mounting of the bracket 112 to the webbing retractor.

Further, in this embodiment, each of the arms 52A, 52B, 52D and 52E is generally T-shaped. A pawl 54 has generally U-shaped bearing portions 56 which are adapted to be pivotally supported by the head of a T-shaped arm, so that the pawl 54 can be pivotally supported by any one of the arms. Different configurations of the pawl 54 may be used in accordance with different mounting angles.

Needless to say, the ball 26 may be substituted by another acceleration-responsive member such as a pendulum.

I claim:

1. A sensor for detecting acceleration of a vehicle which is used in a retractor in which an occupant-restraining webbing is wound, comprising:
    (a) a bracket mounted on said retractor;
    (b) an inertial body supported by said bracket and movable upon sensing acceleration of said vehicle;
    (c) a responsive member for transmitting movement of said inertial body to said retractor; and
    (d) a plurality of mounting means provided with a plurality of surfaces, angled with respect to the central axis of support of said inertial body, on said bracket, said mounting means being alternatively mounted on said retractor to correspond with an angle of said retractor, whereby, even if the angle of mounting position for said retractor on the body of the vehicle is changed, said sensor is substantially vertically disposed relative to said retractor so that a constant acceleration response characteristic of said inertial body is maintained without any change in the condition where said inertial body is supported on said bracket in relation to the body of said vehicle.

2. A sensor for detecting acceleration of a vehicle according to claim 1, wherein said angled surfaces are provided on at least two opposite sides of said bracket.

3. A sensor for detecting acceleration of a vehicle according to claim 2, wherein said mounting means comprise pins projecting from said opposite sides of said bracket.

4. A sensor for detecting acceleration of a vehicle according to claim 3, wherein said opposite sides of said bracket constitute contact surfaces which alternately come into contact with said retractor, said contact surfaces having angles different from each other.

5. A sensor for detecting acceleration of a vehicle according to claim 4, wherein said contact surfaces on said opposite sides of said bracket are constructed such that said contact surfaces cause no change in the condition in which said inertial body is supported if said retractor is mounted in such a manner as to incline from one side of a vertical axis to the other by equal angles from said vertical axis.

6. A sensor for detecting acceleration of a vehicle according to claim 5, wherein said bracket has a conical surface formed therein for receiving said inertial body, said contact surfaces being formed in such a manner as to be inclined by the same angle from the central axis of said conical surface.

7. A sensor for detecting acceleration of a vehicle according to claim 1, wherein said bracket is provided with a plurality of responsive member supporting means, each of said responsive member supporting means being alternatively applied for operably supporting a different responsive member in any different angle of mounting of said bracket to said retractor.

8. A sensor for detecting acceleration of a vehicle according to claim 7, wherein said retractor has locking means including a ratchet wheel, and each of said different responsive members has an engaging portion engageable with said ratchet wheel, said engaging portions having configurations different from each other.

9. An acceleration sensor for use in a seat belt apparatus of a vehicle that employs a webbing for fastening around an occupant of said vehicle, comprising:
(a) a bracket supporting an inertial body;
(b) a responsive member for transmitting movement of said inertial body on said bracket to locking means of a webbing retractor of said seat belt apparatus; and
(c) mounting means provided with a plurality of outer surfaces, angled with respect to the central axis of support of said inertial body, on opposite sides of said bracket for alternatively mounting said bracket on said webbing retractor so that the central axis of support of said inertial body is always kept vertical to attain a constant acceleration response characteristic of said inertial body.

10. An acceleration sensor according to claim 9, wherein said mounting means comprises outer surfaces which are inclined by the same angle from the central axis of support of said inertial body toward opposite sides of said bracket.

11. An acceleration sensor according to claim 10, wherein said mounting means comprises pins capable of being inserted into said retractor.

12. An acceleration sensor according to claim 11, wherein said pins project from said outer surfaces.

13. An acceleration sensor according to claim 9, wherein said bracket has a conical surface formed therein for supporting a ball serving as said inertial body.

14. An acceleration sensor according to claim 13, wherein said bracket is provided with a plurality of responsive member supporting members, each of said supporting members being alternatively applied for operably supporting a different responsive member in accordance with an alteration of the angle at which said bracket is mounted in any different angle to mount said bracket on said retractor.

15. An acceleration sensor according to claim 14, wherein each of said responsive members is pivotally supported selectively by said plurality of responsive member supporting members.

16. An acceleration sensor according to claim 14, wherein each of said responsive members is capable of coming into contact with said ball with the same condition and has a portion adapted to oppose locking means of said retractor and having a different shape so that the alteration of the angle at which said bracket is mounted cause no change in the condition of said portion opposing said locking means.

17. A retractor for use in a seat belt apparatus of a vehicle, comprising:
(a) a retractor frame capable of being mounted on the body of said vehicle at different angles;
(b) a webbing take-up shaft pivotally supported on said retractor frame and having wound thereon a webbing adapted to be fastened around an occupant of said vehicle;
(c) locking means for preventing said webbing take-up shaft from rotating in the direction in which said webbing is wound out, said locking means pivotally supporting a ratchet wheel and being actuated upon prevention of the rotation of said ratchet wheel;
(d) an inertial body which is actuated upon sensing acceleration of said vehicle;
(e) a bracket supporting said inertial body;
(f) a responsive member supported by said bracket for transmitting the action of said inertial body to said ratchet wheel to thereby prevent the rotation of said ratchet wheel; and
(g) mounting means through which said bracket is supported by said retractor frame, said mounting means including mounting surfaces formed on opposite sides of said bracket for contact with said retractor frame, said mounting surfaces being each inclined with respect to the central axis of support of said inertial body so that the supporting axis is always kept vertical even if said retractor frame is mounted on the body of said vehicle at different angles.

18. A retractor according to claim 17, wherein said mounting means includes pins capable of being inserted into said retractor frame.

19. A retractor according to claim 18, wherein said pins each project normally from said mounting surfaces.

20. A retractor according to claim 17, wherein said mounting surfaces are inclined by the same angle from the supporting axis and in the same direction.

21. An acceleration sensor for use in a seat belt apparatus of a vehicle that employs a webbing for fastening around an occupant of said vehicle, comprising:
(a) a bracket supporting an inertial body;
(b) a responsive member for transmitting movement of said inertial body on said bracket to locking means of a webbing retractor of said seat belt apparatus; and
(c) mounting means provided on opposite sides of said bracket for mounting said bracket on said webbing retractor selectively at different angles whereby the central axis of support of said inertial body is always kept vertical to thereby attain a constant acceleration response characteristic of said inertial body even if said retractor is mounted on the body of said vehicle at different angles, wherein said mounting means comprises outer surfaces which are inclined by the same angle from the central axis of support of said inertial body toward opposite sides of said bracket.

22. An acceleration sensor according to claim 21, wherein said mounting means comprises pins capable of being inserted into said retractor.

23. An acceleration sensor according to claim 22, wherein said pins project from said outer surfaces.

* * * * *